UNITED STATES PATENT OFFICE.

JOHN D. KERR, OF MURFREESBORO, TENNESSEE.

HAND-CAR.

941,420.

Specification of Letters Patent.

Patented Nov. 30, 1909.

Application filed February 10, 1909. Serial No. 477,214.

*To all whom it may concern:*

Be it known that I, JOHN D. KERR, a citizen of the United States, resident of Murfreesboro, in the county of Rutherford and State of Tennessee, have made a certain new and useful Invention in Hand-Cars; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
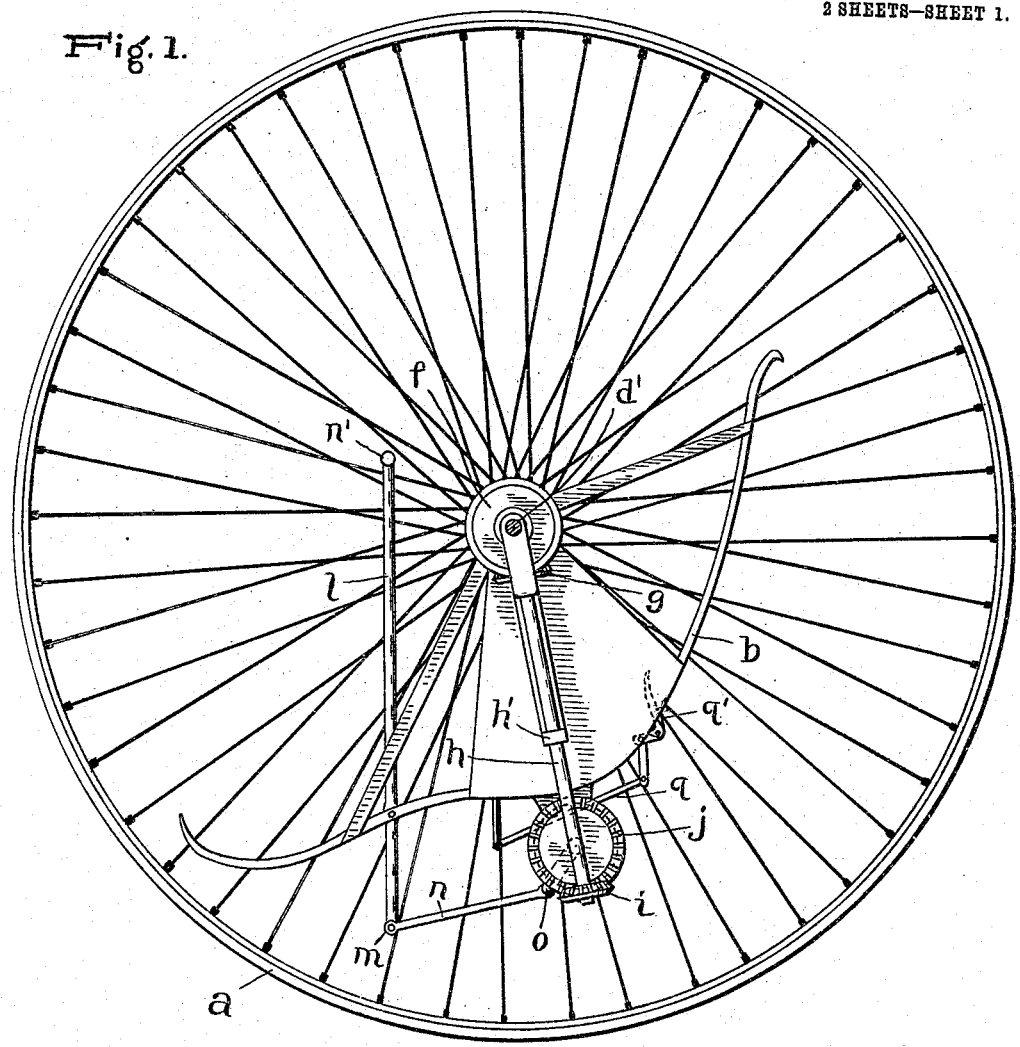
Figure 2:
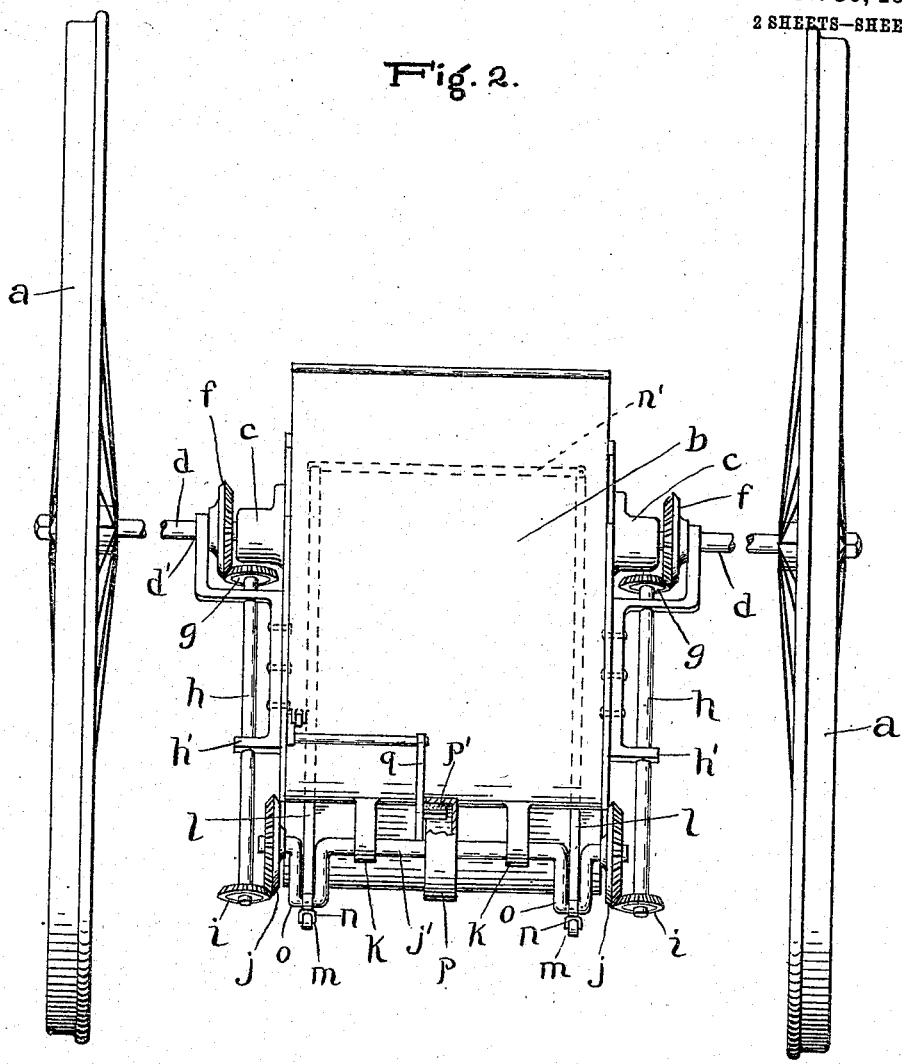

Figure 1 is a section on the line 1—1, Fig. 2. Fig. 2 is a rear view of the hand car embodying my invention.

The invention relates to hand cars or inspection cars for railroads, and it consists in the novel construction and combination of parts as hereinafter set forth.

In the accompanying drawings, illustrating the invention, the letter $a$, designates the carrying wheels, two in number, of light but strong character, being similar to bicycle wheels.

$b$, is the chair-form seat, which is suspended from said wheels by means of short axle sections $d$, $d$, fixed solidly to and turning with the wheels and terminating at their inner ends at said seat, which is provided at each side with a hanger boss $e$, wherein the shaft section $d$, at each side turns or has bearing.

In order to provide the necessary motive power, bevel gears $f$, $f$, are fixed upon the shaft sections $d$, $d$, and are in mesh with bevel gears $g$, $g$, carried at the upper ends of upright shafts $h$, $h$, at each side of the seat $b$, said shafts having rotary bearings in the bracket supports $h'$, $h'$, bolted to the seat $b$, and hung from the shaft sections $d$, $d$, at $d'$, thus aiding in supporting the seat. Bevel gears $i$, $i$, are fixed upon the lower ends of the shafts $h$, $h$, being in mesh with vertical bevel gears $j$, $j$, upon a horizontal shaft $j'$, arranged in bearings $k$, below the seat. Operating levers $l$, $l$, are provided, one at each side of the seat $b$, and fulcrumed thereto at $m$, $m$, connecting rods $n$, $n$, at the lower ends of the short work arms of said levers, having connection with cranks $o$, $o$, of the shaft $j$. The operating levers are worked by means of a transverse handle bar $n'$, connecting the upper ends of the longer power arms thereof.

The chair seat, while being hung freely from the axle sections of the carrying wheels has, owing to its weight, with connections, and the weight of the rider or operator, all swing or vibration almost eliminated, except when starting the car in motion, in climbing grades, or when the car is running at great speeds. Should the car leave the rails, it will run quite well upon the ground.

The car may be readily equipped with brakes, rubber tires and ball bearings, and can be used upon standard or narrow gage tracks. The wheels being strongly and solidly made with steel rims and spokes with an axle of sufficient size and strength to stand all ordinary strain, danger of accidental breakdown is reduced to a minimum.

A brake wheel is provided upon the shaft $j'$, said wheel being hollow and being engaged by a brake block or shoe $p'$, carried by an arm $q$, operated by bell crank lever $q'$, at the side of the seat in convenient position for operation by the occupant.

Having thus described my invention, what I claim as new and desire to secure by Letters Patent is—

1. A railroad hand car, having twin carrying wheels provided with short alined axle sections solidly connected thereto, a seat fitting between and suspended from said axle sections, bevel gears fast upon said axle sections, upright shafts at the sides, having upper gear engagement with said bevel gears and lower bevel gears, a horizontal shaft having rotary bearings below the seat, and carrying bevel gears in mesh with the lower gears of the upright shaft, and an operating lever having fulcrum connection with said seat and driving connection with said horizontal shaft.

2. A railroad hand car, having twin carrying wheels and short alined axle sections fast thereto, a seat fitting between said axle sections and having lateral bosses in which said axle sections have rotary bearings, bevel gears fast upon said axle sections, lateral brackets hung from the axle sections and connected to said seat, upright shafts at the sides having rotary bearings in said lateral brackets, upper gear engagement with said bevel gears and lower bevel gears, a horizontal shaft having rotary bearings below said seat, and carrying bevel gears in mesh with the lower gears of the upright shafts, and operating levers having fulcrum connection with the seat and driving connection with said horizontal shaft.

In testimony whereof I affix my signature, in presence of two witnesses.

JNO. D. KERR.

Witnesses:
JAMES I. CARTTER,
DAVID GOLDSTEIN.